United States Patent [19]

McAlister

[11] 4,436,058
[45] Mar. 13, 1984

[54] HOT WATER SUPPLY TANK ASSEMBLY

[76] Inventor: Roy E. McAlister, 5285 Red Rock North, Phoenix, Ariz. 85018

[21] Appl. No.: 213,199

[22] Filed: Dec. 4, 1980

Related U.S. Application Data

[62] Division of Ser. No. 32,636, Apr. 23, 1979, Pat. No. 4,265,220.

[51] Int. Cl.³ .............................................. F22B 5/00
[52] U.S. Cl. ............................. 122/13 R; 122/13 A; 122/19; 165/104.19; 137/590; 126/437
[58] Field of Search ................. 122/367 R, 367 C, 18, 122/19, 13 R, 13 A, 4 A, 14, 15; 165/153, 104.19; 137/590; 126/437, 435

[56] References Cited

U.S. PATENT DOCUMENTS

| 307,852 | 11/1884 | Folsom | 122/13 R |
|---|---|---|---|
| 1,525,508 | 2/1925 | McCormick | 122/13 A |
| 1,734,274 | 11/1929 | Schubant | 122/367 R |
| 1,855,077 | 4/1932 | Wildt | 122/13 R |
| 2,376,749 | 5/1945 | Belaieff | 165/153 |
| 2,740,803 | 4/1956 | Dorschner | 165/104.19 |
| 3,076,445 | 2/1963 | Ohlhaver | 122/459 |
| 3,275,798 | 9/1966 | Martin | 122/13 R |
| 3,412,787 | 11/1968 | Milligan | 165/153 |
| 3,572,385 | 3/1971 | Acosta | 137/590 |
| 3,857,367 | 12/1974 | Giesen | 122/367 R |
| 4,252,087 | 2/1981 | Kime | 122/367 R |
| 4,256,783 | 3/1981 | Takada et al. | 165/162 |

*Primary Examiner*—Henry C. Yuen

[57] ABSTRACT

A multiple fluid medium energy conversion system for a building which includes a radiant energy panel assembly connectable alternatively with a closed Brayton cycle closed air circuit or an open environmental air circuit, the open environmental air circuit including a clothes dryer selectively mounted therein, a temperature water storage closed circulating system for storing the temperature energy, a room air temperature conditioning circuit and a potable hot water circuit, the potable hot water circuit including an improved potable hot water storage tank assembly, all of the circuits being interrelated by heat exchangers and a control circuit for the system.

5 Claims, 5 Drawing Figures

HOT WATER SUPPLY TANK ASSEMBLY

This application is a division of application Ser. No. 32,636 filed Apr. 23, 1979 U.S. Pat. No. 4,265,220.

This invention relates to solar energy and more particularly to an improved multiple fluid medium solar energy system for a building, which system is suitable to provide multiple fluid conditioning functions for the occupants.

In my co-pending application Ser. No. 32,639, now U.S. Pat. No. 4,301,862, filed concurrently herewith, entitled MULTIPLE FLUID MEDIUM SYSTEM AND IMPROVED HEAT EXCHANGER UTILIZED THEREIN, which issued Nov. 24, 1981 as U.S. Pat. No. 4,301,862 there is disclosed a multiple fluid medium solar energy system for a building and an improved multiple fluid heat exchanger useful therein, said disclosure being hereby incorporated by reference into the present specification. The system of the application includes a heat pump circuit of the type embodying a closed Rankin cycle refrigerant circuit, a potable hot water circuit, a temperature water storage circuit for temperature energy retention, a room air temperature conditioning circuit, and an air circuit for the solar panel means which includes alternative circuitry in heat exchange relation with the other circuits and with an environmental air clothes dryer circuit.

The present system has for its object the provision of a modification of the system described in the aforesaid application in which the aforesaid Rankin cycle closed refrigerant circuit is essentially replaced by a Brayton cycle air circuit integrated with the solar panel means. The present invention also contemplates the provision of an improved potable hot water supply tank assembly which is embodied in the aforesaid system and can be utilized in other systems as, for example, the system disclosed in the U.S. Pat. No. 4,301,862.

These and other objects of the present invention will become more apparent during the course of the following detailed description and appended claims.

The invention may best be understood with reference to the accompanying drawings wherein an illustrative embodiment is shown.

Figures 1, 2:
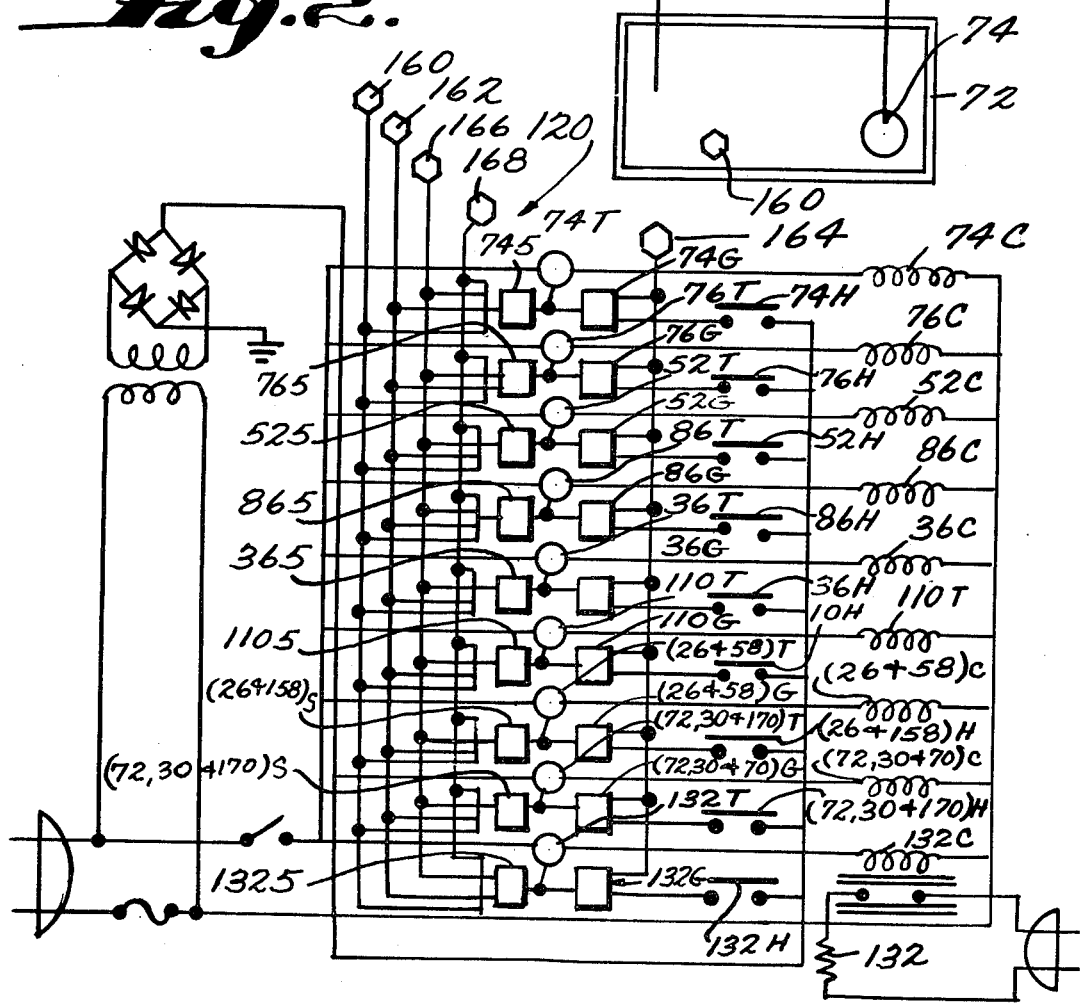
FIG. 1 is a generally schematic flow diagram illustrating the various circuits of the system embodying the principles of the present invention.
FIG. 2 is a schematic wiring diagram illustrating an electrical control circuit for the system shown in FIG. 1.

Referring now more particularly to FIG. 1 of the drawings, there is shown therein a generally schematic diagram of a multiple fluid system 10 for a building where fluid conditioning functions are to be provided for the occupants of the building. Exemplary buildings are homes, apartments, motels, hotels, offices, factories, plants, etc. The system 10 includes a solar panel assembly 12 which is preferably constructed in accordance with the disclosure contained in my copending application Ser. No. 860,779, dated Dec. 15, 1977, entitled RADIANT ENERGY HEAT EXCHANGER SYSTEM, abandoned in favor of a continuation application which issued July 21, 1981 as U.S. Pat. No. 4,279,244. The panel structures of the assembly are preferably made in accordance with the disclosure of my co-pending application Ser. No. 6,754, dated Jan. 26, 1979 entitled APPARATUS FOR FORMING SOLAR ENERGY PANEL, which issued June 2, 1981 as U.S. Pat. No. 4,271,103. Manifolding of the panel structures is accomplished in accordance with my co-pending application Ser. No. 32,635, filed concurrently herewith, entitled METHOD AND APPARATUS FOR MANIFOLDING MULTIPLE PASSAGE SOLAR PANEL, which issued Mar. 16, 1982 as U.S. Pat. No. 4,319,871.

For present purposes, it is sufficient to note that the solar panel assembly 12 includes a plurality of panel structures extruded of a thermoplastic material, such as polycarbonate, so as to provide a multiplicity of elongated thin wall sections defining a multiplicity of elongated parallel passages. Included within the passages of each panel structure is a row of upper passages 14 each of which is separated from the environmental solar energy conditions by a thin wall section of generally lens-shaped cross-sectional configuration and a row of lower passages 16 which are separated from the upper passages 14 by intermediate passages. At each end of the passages there is provided manifold means including upper passage manifold tubes 18 which serve to introduce fluid into and direct fluid out of upper passages 14 and separate lower passage manifold tubes 20 which serve to introduce fluid into and discharge fluid from the lower passages 16. For details of the solar panel assembly 12, reference can be made to the aforesaid patents, the disclosures of which are hereby incorporated by reference into the present specification.

The solar panel assembly 12 is connected in series with a pair of coils 22 of a heat exchanger, generally indicated at 24. As shown, the coils 22 are connected to the upper end of the solar panel assembly which is schematically illustrated as forming a part of a roof of a building, although it will be understood that the panel may form a side wall or be mounted otherwise exteriorly on the building. A two-way valve 26 is provided in conjunction with the manifold tubes 18 and 20 for the purpose of selectively communicating one of the manifold tubes with line 28 leading to one end of the coils 22. The heat exchanger 24 is preferably constructed in accordance with the details contained in the U.S. Pat. No. 4,301,862.

The coils 22 and selected solar panel passages 14 or 16 which are in series are connected alternatively either to a closed Brayton cycle air circuit or an open environmental air circuit. For purposes of selecting which of these two circuits is to be utilized, there is provided a valve 30 to which the opposite ends of the coils 22 are connected. In the closed circuit position of the valve 30, air is directed to one side of a compressor-expander unit generally indicated at 32, which forms a part of the closed circuit. Unit 32 is constructed to include a housing which defines a main chamber having diametrically opposed compression and expansion chamber portions 34 therein. A rotor 36 is mounted within the housing and has sliding vanes 38 which extend through the diametrically opposed chamber portions 34. Rotor 36 is driven by a reversible motor so that its rotation can be in either direction.

The closed circuit also includes lines 40 leading from the chamber portion 34 to a pair of coils 42 which form a part of another heat exchanger assembly, generally indicated at 44, which is constructed in accordance with the disclosure contained in the aforesaid U.S. Pat. No. 4,301,862. In the case of the heat exchanger 44, the same is mounted as part of a room air duct system, schematically illustrated at 46, which includes a return air inlet 48 and a room air outlet 50. Unlike the heat exchanger 24 from which the fan and motor can be eliminated, the heat exchanger 44 is provided with a blower 52 which includes an electric motor and a fan blade, all in accordance with the teachings of U.S. Pat. No. 4,301,862. From the opposite ends of the coils 42 the closed circuit includes line 54 which extend through the opposite chamber portion 34 of the unit 32. The closed circuit is completed by line 56 extending from the aforesaid chamber portion 34 to a valve 58 similar to the valve 26 which selectively communicates line 56 with either the upper passage manifold tube 18 or the lower passage manifold tube 20.

The alternative open environmental circuit includes line 60 extending from selector valve 30 to a hot air clothes dryer assembly, generally indicated at 62. The hot air introduced into the clothes dryer 62 is exhausted therefrom by means of line 64 through a roof vent 66 or other suitable means for directing the flow of hot gas to the environment. The open circuit also includes an inlet 68 which communicates with a blower 70 so as to provide a source of environmental air for the open environmental air circuit. The pressure side of the blower 70 is connected to the line 56 by a selector valve 72 which, when operable, also serves to close off the portion of the closed circuit which is connected by line 56.

The system 10 also includes a conditional water storage circuit which comprises a main storage tank 72 which has insulated peripheral walls and may be provided with anti-convection materials in the central portion thereof large enough to contain a significant volume of water. A pump 74 is provided for pumping water from the storage tank 72 to a selector valve 76. The selector valve 76 serves to direct the storage water through either line 78 or line 80. Line 78 is connected to one end of a coil 82 forming a part of the heat exchanger 24, the coil 82 being in heat exchange relation with the other coils of the heat exchanger, as indicated in the aforesaid U.S. Pat. No. 4,301,862. From coil 82, a line 84 extends to a bypass valve 86. The other line 80 leads to a coil 88 in the heat exchanger 44. The opposite end of the coil 88 is connected by line 90 to the bypass valve 86. In its bypass position, valve 86 directs the water from either line 84 or 90 into a return line 92 which communicates with the storage tank 72 thus completing the circuit.

The present system 10 includes a potable hot water circuit which, as shown, includes a potable hot water supply tank assembly, generally indicated at 94, constructed in accordance with the principles of the present invention. The tank assembly includes a lower unheated water inlet 96 and an upper hot water outlet 98. As shown, the inlet 96 is connected to an appropriate source of unheated water under pressure, as for example, a city water line 101. This line includes the usual backflow preventing device 102. It will also be noted that the main line 100 has a branch line 104 extending therefrom leading to a fourth coil 106 in the heat exchanger 24. The opposite side of the coil 106 communicates with a line 108 leading to a pump 110, the outlet of which is communicated with the outlet 98 of the tank assembly 94. A hot water supply line 112 extends from the pump 110 and outlet 98 to appropriate positions throughout the building, one of which is shown as a shower head 114, schematically in the drawings. A hot and cold water mixing valve 116 is interposed between the hot water line 112 and the shower head. A cold water line 118 leads from the water main 100 to the mixing valve 116.

Figure 3:
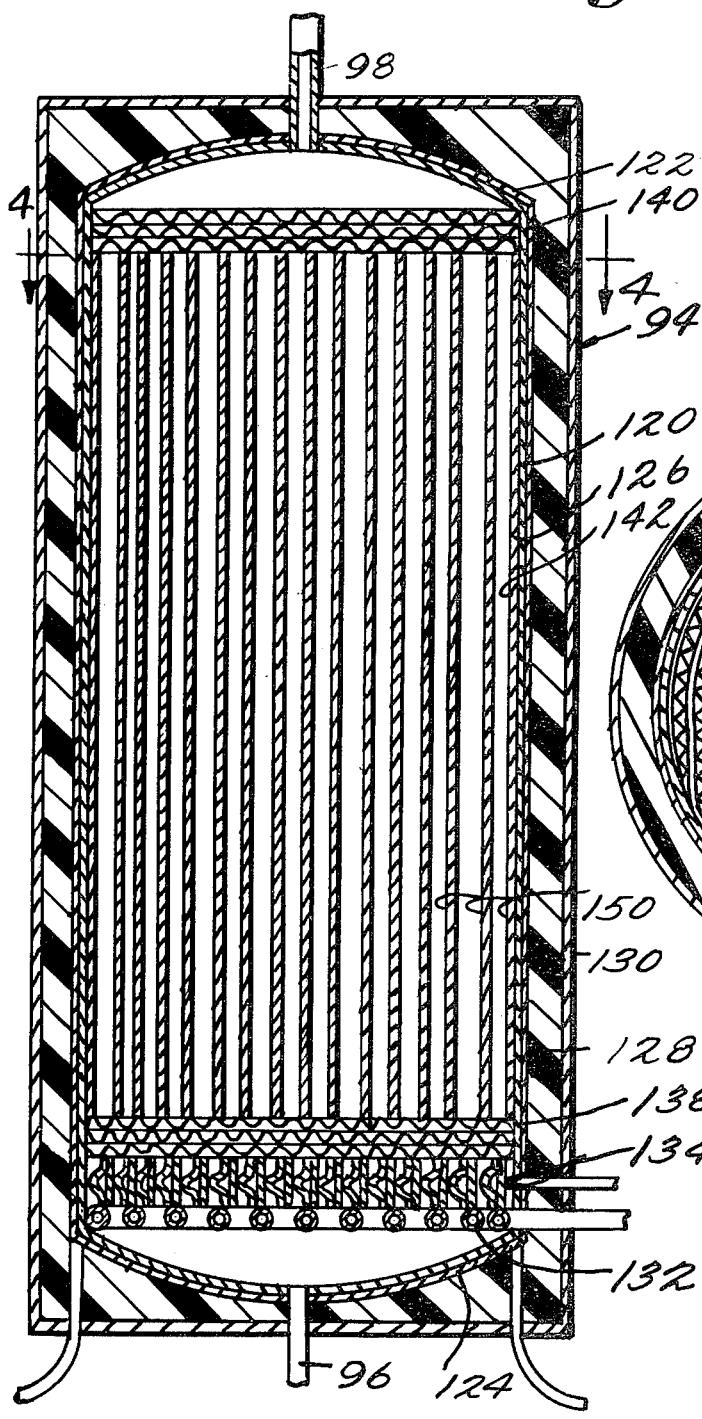
FIG. 3 is a vertical sectional view of a potable hot water supply tank assembly embodying the principles of the present invention utilized in the system shown in FIG. 1.
Figure 4:
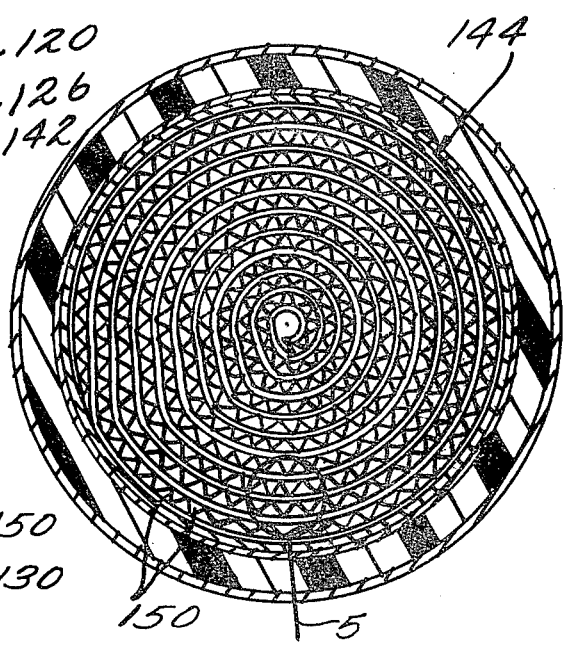
FIG. 4 is a cross-sectional view taken along the line 4—4 of FIG. 3.
Figure 5:
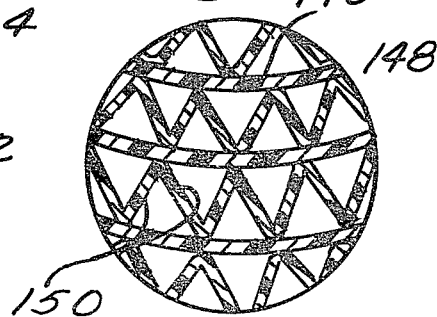
FIG. 5 is an enlargement of a portion of FIG. 4 as indicated at circle 5 of FIG. 4.

Referring now more particularly to FIGS. 3 and 4, the potable hot water supply tank assembly 94 includes a vertically extending insulated housing assembly which, as shown, is preferably constructed of an inner cylindrical wall 120 of suitable metal as, for example, for dip galvanized sheet steel-type 1018 CRS of 0.032" wall thickness, the ends of which are closed as by an upper end closure 122 and a lower end closure 124, both of similar metal material. The entire interior surface of the metal wall 120 and end closures 122 and 124 is coated (e.g., 0.010" wall thickness) with a suitable plastic material as, for example, polyvinylidenefluoride, as indicated at 126. The exterior of the metal wall 120 and end closures 122 and 124 is covered by a layer of insulating material as, for example, a 2" layer 128 of polyvinylidenefluoride foam of 2.5 pounds per cubic foot density., The exterior of the insulating layer is protected by an exterior coating layer 130 which may also be polyvinylidenefluoride coated (e.g., 0.010") metal foil (e.g., 0.014"). It will be understood that other materials may be utilized in forming the housing assembly.

Mounted within the cylindrical wall 120 adjacent the lower end closure 124 is an electric heater coil 132 of the type adapted to be energized by electricity to provide heat for water entering the tank from the lower inlet 96 which, as shown, extends through and communicates with the interior. Disposed above the electrical resistance coil 132 is a heat exchanger coil 134 constructed in accordance with the aforesaid U.S. Pat. No. 4,301,862. Coil 134 forms an alternative part of the temperature storage water circuit and is connected in series therewith by the bypass valve 86 through lines 135 and 136 which connect with the opposite ends of the coil and with the valve.

Above the heat exchanger coil 134 is a screen assembly 138. An exemplary embodiment of the screen assembly includes an outer screen of 150×150 mesh, and intermediate screen of 100×100 mesh and an inner screen of 60×60 mesh. All of the screens are preferably made of polybutylene. Mounted within the tank adjacent the upper closure member 122 is a similar screen assembly 140. The space within the cylindrical wall 120 between the screen assemblies 138 and 140 constitutes a hot water storage chamber 142 within the tank.

In accordance with the principles of the present invention, the chamber 142 is completely filled with an anti-convection material or cartridge, generally indicated at 144, which provides a multiplicity of vertically extending passages having a relatively small cross-sectional area between the screen assemblies 138 and 140. The anti-convection cartridge may assume many configurations. In the arrangement shown, the cartridge is formed by first heat sealing a flat sheet 146 to a corrugated sheet 148, each of which may be formed of polybutylene and may have a wall thickness of 0.010". The sheets are then rolled in a spiral configuration to form the cartridge 144. In this form each of the free crests of the corrugations is engaged by the surface of the flat sheet 146 opposite from the surface to which the corrugated sheet 148 was originally sealed. In this way, the corrugations provide a multiplicity of passages which are indicated at 150. These passages provide for the flow of water upwardly through the chamber 142 in response to the demands which are reflected in the movement of the liquid from the upper outlet 98 communicated to the space above the screen assembly 140.

Although the objects of (1) maximizing the potable water storage volume within the envelope space of 144, (2) minimizing the convection cell tendencies of hot water stored therein, (3) providing uniform hydrostatic upward bulk displacement of hot water by cold water drawn to replace hot water used by building occupants, and (4) providing uniform bulk hydrostatic downward displacement of cold water by hot water when pump 110 is operative; are met by the cartridge cross-section shown in detail 150, numerous other cross-sections and construction techniques are contemplated by the present invention. The cartridge material may be constructed of adjacent tubular elements of essentially any cross-section including circular, elliptical, hexagonal, square, and so forth. The cartridge material may also be extruded in any desired combination of thin walls and small effective diameter open sections.

Towards the object of the invention to maximum process efficiency in all matters including the storage of hot or cold water, it is important to note that the anti-convection cartridge elements are particularly useful in distinguishing cold and hot water that otherwise would tend to be mixed by convection and the mixing momentums provided by pumped fluid entries to storage tanks and reservoirs. It is possible to displace most of the hot water contents of storage 130 with cold water. This means that with the present invention, hot water users receive a more dependable and more uniform supply throughout the day and year. The present invention also maximizes heat exchanger efficiencies by providing the coldest available water to heat sources. Cold water taken to heat exchangers is displaced uniformly downward by hot water from the heat sources.

Similarly the anti-convection cartridge medium may be used in storage 72 to distinguish and preserve hot water portions from cold water portions while providing hydrostatic delivery of each by the effect of the other. This enables the microprocessor circuit to be programmed for considerably higher system C.O.P. values than if the storage water temperature were constantly averaged by convection and fluid entry mixing tendencies.

The manner in which the system is operated is, of course, dependent upon the environmental solar energy available. Four different conditions are identified as (1) summer nights where environmental conditions call for a cooling room load but no solar energy is available (may be a cloudy summer day as well), (2) summer days where a cooling room load is required and solar energy is available, (3) winter days where solar energy is available and a heating room load is called for and (4) winter nights where no environmental solar energy is available and a heating room load is necessary (may be a cloudy winter day as well).

During summer nights air is circulated through outer passages 14 in the solar panel assembly 12 to cause heat rejection to the surrounding atmosphere and sky. The material selection for the panel assemblies' outer passage walls lens is transparent to infrared radiation corresponding to 150° F. to 250° F. working fluid temperatures. Return air is expanded through rotor 36 of expander-compressor unit 32 to cause Joule effect cooling and to gain work from the expansion process. Cool air is utilized as a heat sink for heat exchanger 44 and cooled water is circulated to reservoir storage tank 72. Pump 74 provides flow of storage water upon the opportunity to cool water or the requirement to cool the room by circulating water through heat exchanger 44. Fan 52 provides room air flow through heat exchanger 44. Solenoid operated valve 76 provides flow to heat exchanger 44 or 24. Domestic hot water is provided by heating city water from main line 100 in heat exchanger 24. Domestic hot water is stored in anti-convection cell storage assembly 94. Circulation pump 110 provides flow of domestic water through heat exchanger 24 when there is heat available from heat exchanger 24 and the maximum design storage temperature of the tank 72 has not been exceeded. Shuttle selector valves 26 and 58 provide flow to outer passages 14 for heat rejection.

During a summer day, the solar panel assembly is normally circulated with filtered outside air through outer passages 14 to remove incident solar energy and prevent dwelling heat gain. This significantly reduces air conditioning loads and on the average dissipates about one-half of the summer heat gain for buildings in North America. At times, however, when domestic water heating is needed or clothes drying is possible, the panel heated air is circuited to clothes dryer 62 and heat exchanger 24. Cool water reservoir or storage tank 72 serves as the primary heat sink for all space cooling operations; when, however, the reservoir temperature exceeds the heat sink design temperature (typically 60° F.) supplemental cooling is provided by unit 32. During heat shedding operations shuttle valve 72 and blower 70 provide admission of filtered attic or outside air. Shuttle valve 30 and vent 66 provide dumping of circuited outside air. Shuttle valve 26 and 58 are set for lower passage 16 operation to provide maximum heat gain for clothes drying and rapid domestic water heating.

During a winter day, the rotation of heat pump rotor 36 is reversed to provide hot compressed air to heat exchanger 44. Panel assembly 12 receives expanded cool air which is heated by incident solar energy. Solenoid valve 86 is operated to circulate hot water through domestic hot water storage assembly 94 when the return water from heat exchanger 44 exceeds the storage temperature in unit 94 and the design temperature of unit 94 has not been exceeded. Solenoid valve 76 circulates water from storage tank 72 to heat exchanger 44 to gain heat from compressed air therein. Shuttle valves 26 and 58 are set so that circulation is through the lower passages 16 of panel assembly 12 during winter day operation.

During winter nights, heat gained and stored by the above-described "Winter Day Operation" is preferably utilized for winter night operation. Hot water stored in reservoir or storage tank 72 is circulated through heat exchanger 44 and provides room air, circulated by fan 52, with space heating requirements. City water added to hot water storage unit 94 is also heated by circulation through solenoid valve 86 when the temperature of water at valve 86 exceeds that of the unit 94. In the event that the temperature in storage tank 72 drops below lower design settings, heat pump unit 32 is activated to develop a supply of heat from panel assembly 12. Resistance heater 132 is employed only if snow or ice covers panel assembly 12 and a coefficient or performance (defined below) greater than 1 cannot be realized.

The overall design function of the electrical circuit of FIG. 2 is to provide household comfort with the minimum power cost. This is accomplished by operating each component of the system in a cooperative way to achieve the maximum annual coefficient of performance (C.O.P.). The C.O.P. is simply the individual system scaling factor "SF" times the ratio of $$COP = S.F. \left( \frac{T_L}{T_H - T_L} \right)$$

where $T_L$ and $T_H$ are the lower and higher working fluid temperatures (in absolute degrees) in the Brayton cycle heat pump loop.

Although any suitable circuit components may be utilized in the control circuit of FIG. 2, it is preferred to use solid state triacs, indicated by the correspondingly functional part number plus a subscript T as triacs 74T, 76T, 52T, 86T, 36T, 110T, (26 and 58)T, (72, 30 and 70)T and 132T, to drive corresponding inductive loads 74C, 76C, 52C, 86C, 36C, 110C, (26 and 58)C, (72, 30 and 70)C and 132(C), the latter to drive resistive load 132. The circuit is controlled in accordance with temperature conditions of the system, information as to which is provided by temperature sensors located as follows. Temperature sensor 160 is positioned within storage tank 75 to sense the water temperature therein. Sensor 162 is positioned adjacent valve 86 to sense the water temperature entering the same. Sensor 164 is a typical room air temperature indicator positioned on a wall or the like. Sensor 166 is positioned within the lower portion of tank 94 to sense the water temperature therein. Finally, sensor 168 is positioned exteriorly adjacent the panel assembly 12 to sense the environmental temperature thereat. Any suitable temperature sensors may be utilized, including bimetallic potentiometers, thermistors, thermocouples, pressure thermometers, or thermoresistive elements. Comparison of the output signals of sensors 160, 162, 166 and 168 is made according to Table 1 by triac gate control solid state circuits, indicated by corresponding numerals with S subscripts. The seasonal settings ("cooling" or "heating") from the room thermostat associated with sensor 164 and "Night" and "Day" determinations are made by triac gate control circuits evaluating the temperature indicated at sensors 164, these circuits being indicated by a subscript G. Circuits G provide memory of the previous 96 hours temperature highs and lows. Day conditions are determined as the period having the ability to collect heat by radiation.

Circuits G are also equipped with a Day/Night changeover delay to prevent undesirable changeovers due to passing clouds. It is possible, therefore to operate at "night" conditions during a prevailing day rain storm during the summer.

Circuits G always make the decision according to the maximum C.O.P. (based upon the previous 96 hours) per the logic of Table 1.

$$COP = S.F. \left( \frac{T_L}{T_H - T_L} \right)$$

In order to maximize the C.O.P. tanks 94 and 72 are operated at maximum allowable temperatures when ambient conditions are suited. In the summer, the temperature in tank unit 94 usually exceeds the desired shower or hand washing temperature and cold water is automatically proportionally mixed at valve 116 to reduce the supplied water to a desired temperature. In the summer, storage tank 72 is reduced to the lowest design temperature (about 33° F.) during clear nights, rain storms and other instances when high C.O.P. cooling effects are available. Space cooling operation during subsequent periods (when day time high temperatures may, for instance, exceed 100° F.) are at overall high C.O.P. values because normally only fan 52 and pump 74 are operational. Dryer 62 is also preferably designed as a well-insulated heat sink with provisions for a change of phase heat storage medium in the cabinet walls.

Heat exchangers 24, 44 and 134 are preferably designed according to my co-pending invention U.S. Pat. No. 4,301,862 as aforesaid. This design may also be incorporated with or without additional circulation from tanks 94 and 72 into dryer 62 or other similar appliances such as clothes washers to further improve the solar energy supplementations of their energy requirements.

The circuit logic provided by the preferred control system is illustrated on Table 1 as follows:

TABLE 1

| | CONTROL LOGIC | | | |
|---|---|---|---|---|
| | NORMAL COMPONENT MODE | | | |
| | WINTER DAY | WINTER NIGHT | SUMMER DAY | SUMMER NIGHT |
| Panel (12) | Low Pressure Bottom Channel | Low Pressure if Operated | Top Channels Open Loop Shedding | Top Channels High Pressure |
| Rotor (36) | Clockwise | Clockwise | Stop | Counter Clockwise |
| Compressor-Expander (32) | On | On if (164) exceeds (160) & COP 1 | Off | On |
| Heat Exchanger (44) | (12) Air to water (94 & 72) & air to air | (72) water to air | (72) water to air | (72) water to air |
| Main Reservoir | gaining heat | giving heat | gaining heat | giving heat |
| Main Reservoir Pump (74) | On if (162) exceeds (160) | On if (164) low | On if (164) high | On if (164) high |
| Room Air Blower (52) | On it (164) is below dry pt | On if (164) low | On if (164) high | On if (164) high |
| Three-Way Valve (76) | (27) to (44) | (72) to (44) | (72) to (24) | (72) to (24) |
| Heat Exchanger (24) | No Exchange | No Exchange | (12) air to water (94) | (32) air to water (94) |
| City Water Supply (100) | 50 to 80 psi | 50 to 80 psi | 50 to 80 psi | 50 to 80 psi |

TABLE 1-continued

| | CONTROL LOGIC NORMAL COMPONENT MODE | | | |
|---|---|---|---|---|
| | WINTER DAY | WINTER NIGHT | SUMMER DAY | SUMMER NIGHT |
| | 40 to 60° F. | 40 to 60° F. | 60 to 80° F. | 60 to 80° F. |
| Domestic Hot Water Storage (94) | 115 to 200° F. | 115 to 200° F. | 115 to 200° F. | 115 to 200° F. |
| Domestic Hot Water Circ Pump (110) | Off | Off | On if (36) or (70) runs | On if (36) or (70) runs |
| Clothes Dryer (62) | Resistance Assisted | Resistance Assisted | Solar Heated | Resistance Assisted |
| Three-Way Valve (86) | To (94) if (162) exceeds (166) | To (94) if (162) exceeds (166) | To (94) if (162) exceeds (166) | To (94) if (162) exceeds (166) |
| Resistance Heater (132) | On if (166) is low but exceeds (162) | On if (164) Exceeds (160) | Off | Off |
| Main Storage Temp Sensor (160) | 80 to 200° F. | 80 to 200° F. | 35 to 65° F. | 35 to 65° F. |
| Loop Water Temp Sensor (162) | Reference | Reference | Reference | Reference |
| Room Temp Sensors (164) | Reference (control) | Reference (control) | Reference control | Reference control |
| Domestic Hot Water Temp Sensor (166) | (control) | (control) | (control) | (control) |
| Panel Temp Sensor (168) | Reference | Reference | Reference | Reference |
| Panel Channel Valve (26) | Top bottom or middle & bottom | To top channels | To top channels | To top channels |
| Panel Channel Valve (58) | Top bottom or middle & bottom | To top channels | To top channels | To top channels |
| Air Loop Valve (72) | Closed | Closed | Open | Closed |
| Air Loop Inlet Filter (68) | No flow | No flow | Flow | No flow |
| Air Loop Exhause Filter (66) | No flow | No flow | Flow | No flow |
| Air Loop Valve (30) | Closed | Closed | Open | Closed |
| Air Loop Blower (70) | Off | Off | On | Off |
| Proportional Mixer Valve (116) | Operational | Operational | Operational | Operational |

In the preferred circuit, the thermocouple or thermistor signals from sensors 160, 162, 166 and 168 are compared on circuits S to produce the logic control signals of Table 1. Amplifications of the logic control signal and gating of triacs T is preferred by common solid state components. Manual operation of each electromechanical element of the circuit is possible for troubleshooting purposes by depressing switches H.

Microprocessor functions include memory (charting) the past 96 hours demands for heting or cooling, hot water, heat from drying clothes, and ambient conditions at 164. Thus the annual C.O.P. can be maximized while maintaining complete comfort to the home.

It thus will be seen that the objects of this invention have been fully and effectively accomplished. It will be realized, however, that the foregoing specific embodiments have been shown and described only for the purpose of illustrating the principles of this invention and are subject to extensive change within departure from such principles. Therefore, this invention includes all modifications encompassed within the spirit and scope of the following claims.

What is claimed is:

1. A potable hot water supply tank assembly comprising a generally vertically extending housing assembly including a peripheral wall and upper and lower end closures, inlet means for directing a supply of unheated water into said housing assembly adjacent said lower end closure, outlet means for directing a supply of hot water from said housing assembly adjacent said upper end closure, heater means within said housing assembly adjacent said lower end closure, a lower screen assembly within said housing assembly above said heating means, an upper screen assembly within said housing assembly adjacent said upper end closure and defining with said lower screen assembly and the coextensive portion of said peripheral wall a supply chamber within said housing assembly, and anti-convection cartridge means having structure providing a multiplicity of separate vertical passages constituting the entire space remaining in said supply chamber other than said structure, said passage being of relatively small cross-sectional area and extending completely between said screen assemblies.

2. An assembly as defined in claim 1 wherein said anti-convection cartridge means comprises a spiral roll of plastic sheet material.

3. An assembly as defined in claim 2 wherein said sheet material includes a flat sheet and a corrugated sheet engaging the surface of said flat sheet.

4. An assembly as defined in claim 1, 2 or 3 wherein said screen assembly includes a plurality of screen layers of progressively increasing smaller mesh from the interior of said chamber to the exterior thereof.

5. An assembly as defined in claim 1, 2 or 3 wherein said housing assembly includes a metal peripheral wall and metal end closures, a coating of plastic material on the interior surfaces thereof, a layer of insulating material on the exterior surfaces thereof and a plastic coating on the exterior of said layer of insulating material.

* * * * *